(12) United States Patent
Osborn et al.

(10) Patent No.: US 8,053,622 B2
(45) Date of Patent: Nov. 8, 2011

(54) STRIPPING METHOD

(75) Inventors: Nigel John Osborn, Amersham (GB); Julian Grigg, Amersham (GB)

(73) Assignee: GE Healthcare Limited, Amersham (GB)

( * ) Notice: Subject to any disclaimer, the term of this patent is extended or adjusted under 35 U.S.C. 154(b) by 952 days.

(21) Appl. No.: 11/909,465

(22) PCT Filed: Mar. 21, 2006

(86) PCT No.: PCT/GB2006/001034
§ 371 (c)(1),
(2), (4) Date: Sep. 24, 2007

(87) PCT Pub. No.: WO2006/100471
PCT Pub. Date: Sep. 28, 2006

(65) Prior Publication Data
US 2008/0226543 A1  Sep. 18, 2008

(30) Foreign Application Priority Data
Mar. 24, 2005  (GB) .................................. 0506041.3

(51) Int. Cl.
*G21F 9/14*  (2006.01)
(52) U.S. Cl. .......................................... 588/20; 588/318
(58) Field of Classification Search ............. 588/20, 588/318; 423/488
See application file for complete search history.

(56) References Cited

U.S. PATENT DOCUMENTS

| | | | |
|---|---|---|---|
| 2,139,227 A | 12/1938 | Goetz | |
| 3,785,990 A | 1/1974 | Benjamins | |
| 4,444,740 A * | 4/1984 | Snodgrass et al. | 423/483 |
| 4,840,731 A | 6/1989 | Sheikh | |
| 5,164,174 A * | 11/1992 | Banker et al. | 588/316 |
| 5,414,100 A | 5/1995 | Ayorinde et al. | |
| 6,599,429 B1 | 7/2003 | Azizian | |
| 6,845,137 B2 * | 1/2005 | Ruth et al. | 376/195 |

FOREIGN PATENT DOCUMENTS
GB  1265769  3/1972

OTHER PUBLICATIONS

GB0506041.3 Search Report dated Aug. 5, 2005.
PCT/GB2006/001034 Int'l Search Report dated Sep. 26, 2006.
Rubel, Frederick, et.al., "Pilot study of luoride and arsenic removal from potable water" 1980, US Environmental Protection Agency, Cincinnati, Ohio.

* cited by examiner

*Primary Examiner* — Edward Johnson

(57) ABSTRACT

The invention describes a method for stripping alumina which is particularly suitable for removal of fluoride from alumina and comprises washing said alumina with an aqueous acid or alkali at elevated temperature. The method may be used for removal of unreacted radiofluoride such as [$^{18}$F] fluoride from alumina following a radiofluorination reaction. Automated synthesis apparatus and cassettes therefor, which are adapted to perform the method are also claimed.

10 Claims, 3 Drawing Sheets

STRIPPING METHOD

This application is a filing under 35 U.S.C. 371 of international application number PCT/GB2006/001034, filed Mar. 21, 2006, which claims priority to application number 0506041.3 filed Mar. 24, 2005, in Great Britain, the entire disclosure of which is hereby incorporated by reference.

The present invention relates to a method for stripping alumina, such as removal of fluoride from alumina as a stripping method, for example where the alumina has been used to extract radiofluoride such as [$^{18}$F]fluoride from a radiosynthesis reaction mixture. The invention further provides apparatus for performing said method.

Alumina (aluminium oxide) is used for removal of fluoride from water by adsorption, for example in treatment of aqueous effluent and treatment of drinking water. Alumina is also used for removal of unreacted [$^{18}$F]fluoride from a radiosynthetic reaction mixture, for example following synthesis of 2-[$^{18}$F]fluoro-2-deoxy-D-glucose ([$^{18}$F]FDG).

Radiotracers, such as [$^{18}$F]FDG are now often prepared on an automated radiosynthesis apparatus using nucleophilic radiofluorination chemistry with $^{18}$F$^-$, based on the reagent Kryptofix™ 2.2.2. There are several examples of such apparatus commercially available, including Tracerlab MX (Coincidence Technologies SA) and Tracerlab FX (Nuclear Interface GmbH). Such apparatus commonly comprises a cassette, often disposable, in which the radiochemistry is performed, which is fitted to the apparatus in order to perform a radiosynthesis. The cassette normally includes fluid pathways, a reaction vessel, and ports for receiving reagent vials as well as any solid-phase extraction cartridges used in post-radiosynthetic clean up steps.

Where radiosynthesis is performed on an automated apparatus, one important factor for the efficiency of the apparatus is how quickly the apparatus can be used to perform a subsequent run—this is dependent on how much residual radioactivity is present in the cassette as this dictates how soon the operator is able to reload the apparatus with a fresh cassette or fresh reagents for a subsequent synthetic run. Depending on the half-life of the radioisotope being used, in the absence of a stripping process, the cassette may need to be left for several hours or even days to allow the radioactivity to decay before the cassette can be changed. The trend, with increasing cyclotron efficiencies, is for radiosynthesis to be performed at higher levels of radioactivity, which in turn means that higher levels of radioactivity remain in the cassette following a synthetic run. In some automated radiosynthesis apparatus, a significant proportion of the residual radioactivity is adsorbed on alumina held in a vessel forming part of the cassette. This means that there is a need for a method for stripping alumina more rapidly to reduce the time in which the apparatus stands idle between runs.

According to one aspect of the invention, there is provided a method for stripping alumina which comprises washing said alumina with an aqueous acid or alkali, such as an aqueous solution of a metal hydroxide, at elevated temperature.

The stripping method is particularly suitable for removal of fluoride from alumina. Therefore, according to a further aspect of the invention there is provided a method for removal of fluoride, suitably radiofluoride such as [$^{18}$F]fluoride, from alumina comprising washing said alumina with an aqueous acid or alkali, such as an aqueous solution of a metal hydroxide, at elevated temperature. The waste stream from the alumina can then be transferred to a shielded waste vessel, where the radioactivity can decay without dose to the operator.

Suitable aqueous acids for use in the stripping method include aqueous inorganic acids such as hydrochloric acid, sulphuric acid, or nitric acid.

Suitable aqueous alkalis for use in the stripping method include aqueous metal hydroxides. The metal hydroxide is suitably an alkali metal hydroxide (for example sodium hydroxide or potassium hydroxide) or an alkaline earth metal hydroxide (for example magnesium or calcium) present in solution at a concentration of between 0.2 and 10 molar, suitably 0.5 to 5 molar, more suitably 1 to 3 molar for example 2 molar. Preferably the metal hydroxide is sodium or potassium hydroxide.

The alumina may be neutral alumina or acidic alumina, and is preferably acidic alumina. The alumina is suitably used in the form of a powder with particle size in the range 10 to 500 μm. Commercially available alumina, which may be used for adsorption of fluoride, includes Waters Sep-Pak®, or Alltech Maxiclean™ or Extract-clean™.

The alumina washing is performed at elevated temperature, this is at a temperature of between 40° C. and boiling point of the aqueous acid or alkali, such as aqueous metal hydroxide solution, preferably at around 80° C., for example 75° C. to 85° C. The elevated temperature may be achieved either by contacting the alumina with a heated aqueous acid or alkali, such as aqueous metal hydroxide solution or by applying heat to the alumina with an external heat source before and/or during contact with an aqueous acid or alkali, such as an aqueous metal hydroxide solution.

In one embodiment of the invention, the aqueous acid or alkali, such as a metal hydroxide solution is heated by adding an aqueous alkali or acid solution respectively such that the neutralisation reaction exotherm generates heat. This embodiment has the advantage that the need for an external heat source for the alumina is avoided, which may be important in the design of an automated synthesis apparatus such as an automated radiosynthesis apparatus. Where an aqueous acid solution is used to heat an aqueous alkali solution, the aqueous acid solution is suitably an aqueous inorganic acid, such as phosphoric acid, hydrochloric acid, sulphuric acid, acetic acid and the like, and is suitably at a concentration of from 250 mM to 5 M, for example 500 mM to 2 M. Typically, the metal hydroxide solution is present in substantial excess, such that after adding the acid, the levels of metal hydroxide are 0.2 to 10 molar, more suitably 1 to 3 molar, for example 2 molar.

The washing step may be performed by mixing the alumina with the aqueous acid or alkali, such as aqueous metal hydroxide solution in a container and then separating the alumina by filtration. Alternatively, and particularly suitably when the alumina is used within an automated synthesis apparatus, the alumina may be contained in a vessel through which the aqueous acid or alkali, such as aqueous metal hydroxide solution, is passed. The aqueous acid or alkali, such as aqueous metal hydroxide solution, may be passed through the alumina as a continuous flow, for example at a flow rate of from 0.1 ml/min to 100 ml/min, or in batches, so as to permit sufficient residence time on the cartridge for the stripping to occur.

As mentioned above, the stripping method has particular utility in the field of automated radiosynthesis, for example, for removal of radiofluoride such as [$^{18}$F]fluoride from an alumina cartridge. In this application of the stripping method, it is important that the amount of [$^{18}$F]fluoride left on the alumina is as low as possible, thus the amount of [$^{18}$F]fluoride remaining on the alumina following the stripping method is more important than the amount which has been removed.

As would be understood by the person skilled in the art, the alumina may be held in any suitable container such as a plastic or metal column, cartridge, or syringe barrel—said container and the alumina are referred to herein as an "alumina cartridge".

An embodiment of the invention is now described with reference to FIG. 1 which is a schematic illustration of part of a representative radiofluorination apparatus in which the following process steps may be performed.

FIG. 1 shows a cassette 1 shown schematically by a dashed line which is attachable to an automated synthesis apparatus (not shown in full). The synthesis apparatus may contain pumps, actuators, sensors, and control means, known in the art for running synthesis in a cassette. Cassette 1 comprises an elongated fluid pathway 4, to which vessels such as one or more container 2, syringe 6, reaction vessel 8, and cartridges 10, 12, are connected. The synthesis apparatus further comprises a heat source 16 arranged to be able to heat container 12 and/or 14. FIG. 2 shows an equivalent apparatus to that in FIG. 1 wherein the cassette 1 further comprises a heat source 16 arranged to be able to heat container 12 and/or 14.

(i). Preparation of a radiolabelling agent. In one aspect of the invention, where the apparatus is used to perform radiofluorination, the radiolabelling agent is $^{18}F^-$ which may be prepared by irradiation of $^{18}O$ enriched water and trapped onto an ion exchange cartridge. The radiolabelling agent may be prepared by eluting the $^{18}F^-$ with a phase transfer agent such as Kryptofix 2.2.2, an inorganic base such as potassium carbonate, with a suitable aprotic solvent such as acetonitrile. Such reagents and solvents are held in containers 2, suitably vials or syringes which may form part of the cassette 1 or be attached to the cassette by the operator prior to performing a synthetic run. The reagents and solvents may be transferred either automatically or manually through a fluid pathway 4 by controlling pressure (positive or negative) within the system, for example, by way of pumps (not shown) or syringes 6 or by using an inert gas such as nitrogen.

(ii). Reaction between the radiolabelling agent and radiolabelling substrate. In one aspect of the invention, the radiolabelling substrate contains a leaving group, for example an alkyl-, haloalkyl-, or aryl-sulphonate, which is displaced by a nucleophile such as $^{18}F^-$. One commonly used radiolabelling substrate is 1,3,4,6-tetra-O-acetyl-2-O-trifluoromethanesulfonyl-β-D-mannopyranose (commonly known as mannose triflate) which is used as a precursor in the synthesis of [$^{18}F$]FDG. Such reactions may be performed in solution- or solid-phase and may take place in one or more reaction vessels 8 forming part of the cassette 1. Reaction conditions (such as temperature and reaction time) may be automatically controlled by computer program in an automated synthesis apparatus, or alternatively manually controlled by the operator.

(iii). Deprotection. Where reactive groups in the radiolabelling substrate are chemically protected to prevent side-reactions, any protecting groups remaining after the reaction need to be removed. Such deprotection is commonly a hydrolysis step, performed by addition of aqueous acid or alkali to the protected intermediate. In the synthesis of [$^{18}F$]FDG, a common protected intermediate is 2-fluoro-1,3,4,6-tetra-O-acetyl-D-glucose (tetraacetylfluorodeoxyglucose or pFDG). Deprotection may conveniently be performed in the reaction vessel 8, or on solid phase, for example using the methods described in U.S. Pat. No. 6,172,207.

(iv). Purification. The crude reaction mixture needs to be purified, to remove excess reagents. Purification techniques conventionally used in automated synthesis apparatus include C18 cartridges 10 for adsorption of organics and alumina cartridges 12 for removal of excess radionuclide such as radiofluoride, for example $^{18}F^-$ as well as microfiltration to ensure sterility of the final radiopharmaceutical. The purified mixture is then passed to a dispenser 20 for formulation and/or dispensing.

(v). Cassette clean-up. At the end of a synthetic run, excess radioactivity needs either to be allowed to decay, or to be removed so that the cassette can be replaced for a subsequent synthetic run. This embodiment of the process according to the invention involves washing the alumina cartridge 12 with an aqueous solution of an acid or alkali, such as a metal hydroxide, from a container thereof 14. The temperature at which the washing step is performed being important for efficiency of the fluoride stripping, is controlled by a heat source 16 positioned in the apparatus and controlled so as to heat either the aqueous solution of metal hydroxide in its container 14 or the alumina cartridge 12 when the cassette is positioned in the apparatus. On completion of the washing step, the aqueous solution containing the waste radiofluoride is transferred to a shielded waste container 18. With the radioactivity reduced to a safer level, the operator may then either replace the cassette 1 with a fresh cassette, or load replacement reagents for a subsequent synthetic run.

According to a further aspect of the invention, there is provided an automated synthesis apparatus comprising an alumina cartridge for removal of fluoride ions from an aqueous reaction mixture, characterised in that the apparatus is adapted to allow stripping of said alumina by washing said alumina with an aqueous acid or alkali, such as, an aqueous metal hydroxide solution at elevated temperature as described above.

The alumina cartridge may be housed in a disposable or removable cassette designed for use with the automated synthesis apparatus. Therefore, the invention further provides a cassette for an automated synthesis apparatus comprising an alumina cartridge for removal of fluoride ions from an aqueous reaction mixture, characterised in that the cassette is adapted to allow stripping of said alumina by washing said alumina with an aqueous acid or alkali, such as a metal hydroxide solution, at elevated temperature as described above.

The invention is now illustrated by way of the following examples.

EXAMPLES

Example 1

Fluoride Displacement from Acidic Alumina Cartridges Using Heating

Materials
Acidic alumina cartridges: Waters WAT020500 #041434265A
$^{18}$F-fluoride: Hammersmith Imanet Ltd., UK
Sodium hydroxide: Aldrich 484024 #06614EB 97%
Method A 300 mg acidic alumina cartridge was equilibrated with 10 ml water and then around 14 MBq $^{18}$F-fluoride was injected. The cartridge was washed with 1 ml water and then 3 ml 2 M sodium hydroxide was injected in 1 ml aliquots collecting each fraction and measuring the activity in an ion chamber. After 3 ml the remaining activity on the cartridge was measured.

The process was repeated, trapping around 14 MBq activity on a second acidic alumina cartridge as above. The 2 M sodium hydroxide was pre-heated up to 50° C. prior to injecting on the cartridge and 3×1 ml was injected on to the cartridge collecting each fraction and measuring activity as above. The residual activity on the alumina cartridge was measured at this point.

The process was repeated trapping around 9 MBq activity on a third acidic alumina cartridge as above. The 2 M sodium hydroxide was injected on the cartridge heating with a hot air gun (nozzle temperature around 100° C.) and 3×1 ml was injected on to the cartridge, collecting each fraction as measuring activity as above together with the residual activity on the cartridge.

Figure 1:
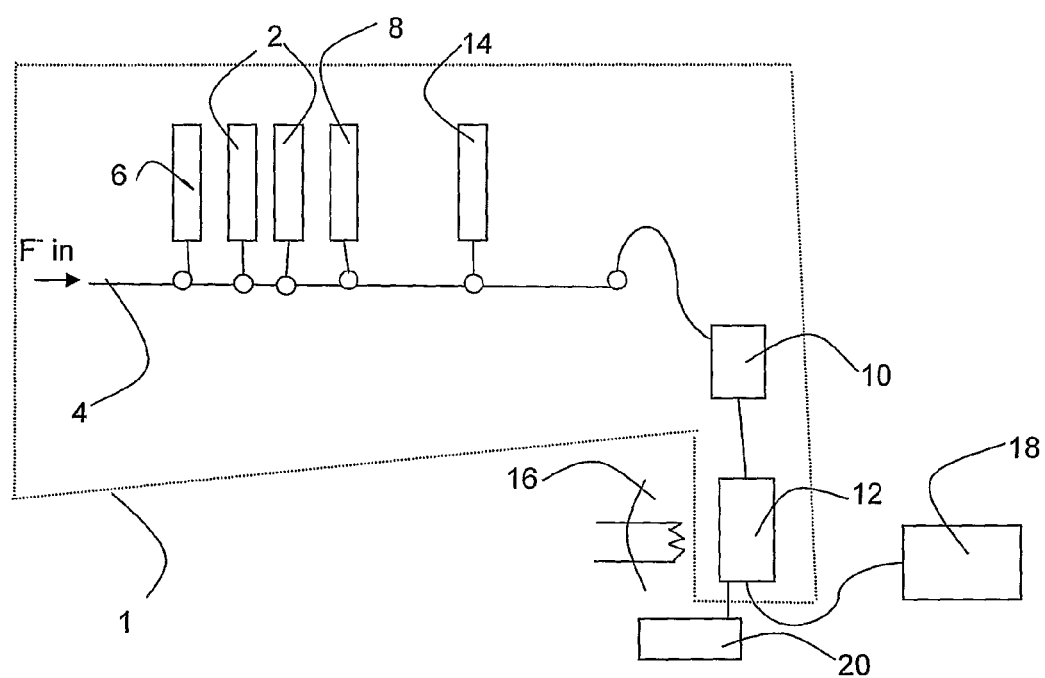
FIG. 1 shows a cassette 1 shown schematically by a dashed line which is attachable to an automated synthesis apparatus (not shown in full). The synthesis apparatus may contain pumps, actuators, sensors, and control means, known in the art for running synthesis in a cassette. Cassette 1 comprises an elongated fluid pathway 4, to which vessels such as one or more container 2, syringe 6, reaction vessel 8, and cartridges 10, 12, are connected. The synthesis apparatus further comprises a heat source 16 arranged to be able to heat container 12 and/or 14.
Figure 2:
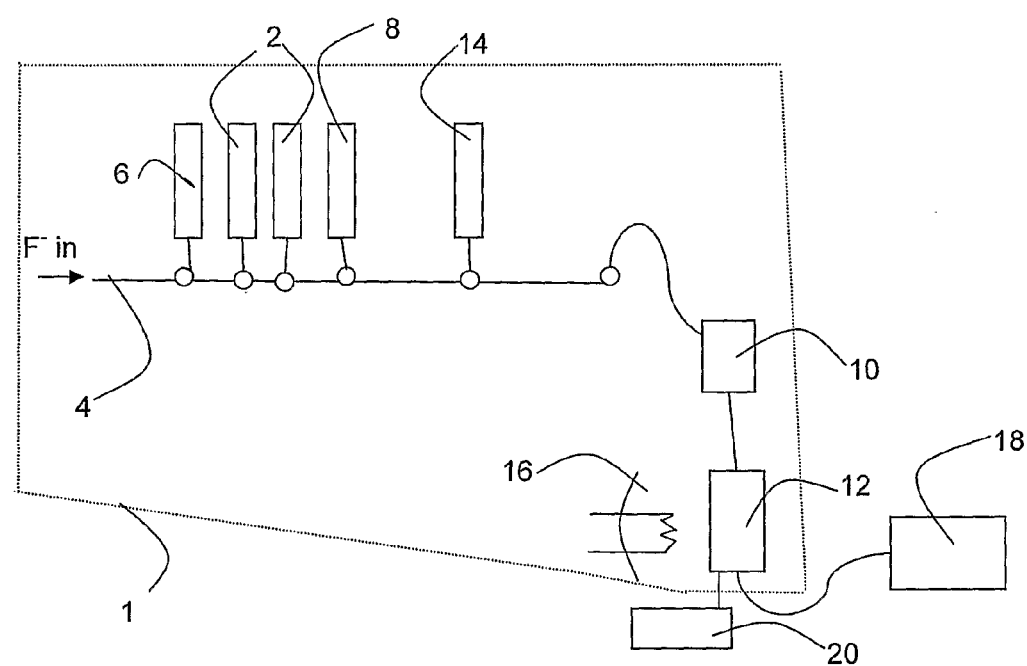
FIG. 2 shows an equivalent apparatus to that in FIG. 1 wherein the cassette 1 further comprises a heat source 16 arranged to be able to heat container 12 and/or 14.
Figure 3:
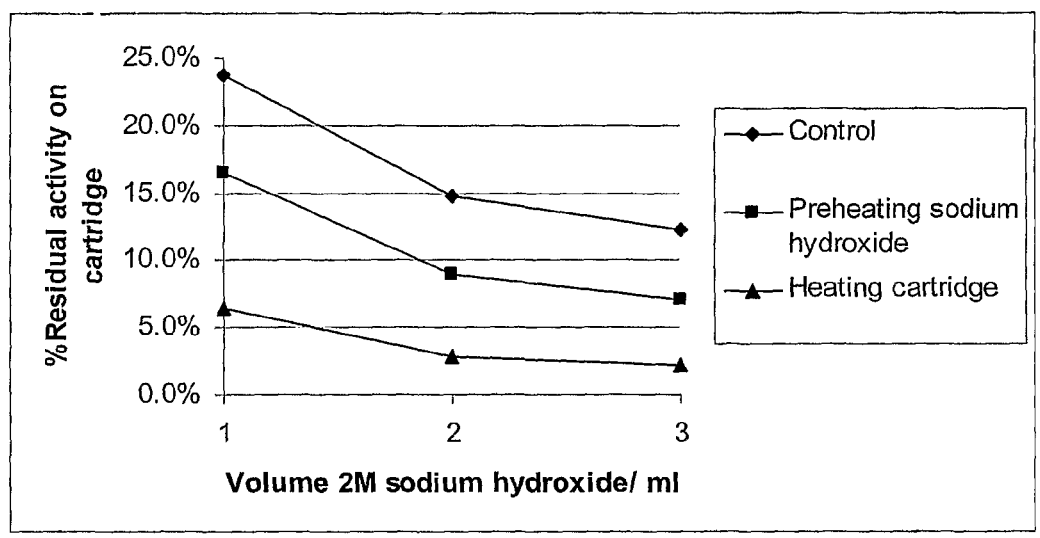
FIG. 3 shows the results of Example 1.

The results are shown in FIG. 3. Clearly, preheating the sodium hydroxide prior to injection on to the cartridge results in a significant decrease in the residual activity on the cartridge. This is further improved by directly heating the cartridge as the sodium hydroxide is passed down it with levels of residual activity about one fifth of the control experiment after 3 ml 2 M sodium hydroxide has been injected.

Example 2

Use of Exothermicity of Acid-Base Reactions for Alumina Cartridge Stripping

Materials
Acidic alumina cartridges: Waters WAT020500 #041434265A
$^{18}$F-fluoride: Hammersmith Imanet Ltd., UK
Phosphoric acid: Aldrich 85%: 43,808-1 #U01380
Sodium hydroxide: Aldrich 484024 #06614EB 97%
Method To sodium hydroxide (2.5 M, 6 ml) was added phosphoric acid (0.405 ml) and the solution allowed to cool to room temperature. A 300 mg acidic alumina cartridge was equilibrated with 10 ml water and then 8.7 MBq $^{18}$F-fluoride was added. The cartridge was washed with 1 ml water and then the sodium hydroxide/phosphoric acid solution was injected in 1 ml aliquots, measuring the eluent in each case. The remaining activity on the cartridge was also measured.

The process was repeated trapping 6.1 MBq activity on a second acidic alumina cartridge. However, on this occasion the sodium hydroxide/phosphoric acid solution was injected onto the acidic alumina cartridge immediately after mixing before the solution had time to cool.

Figure 4:
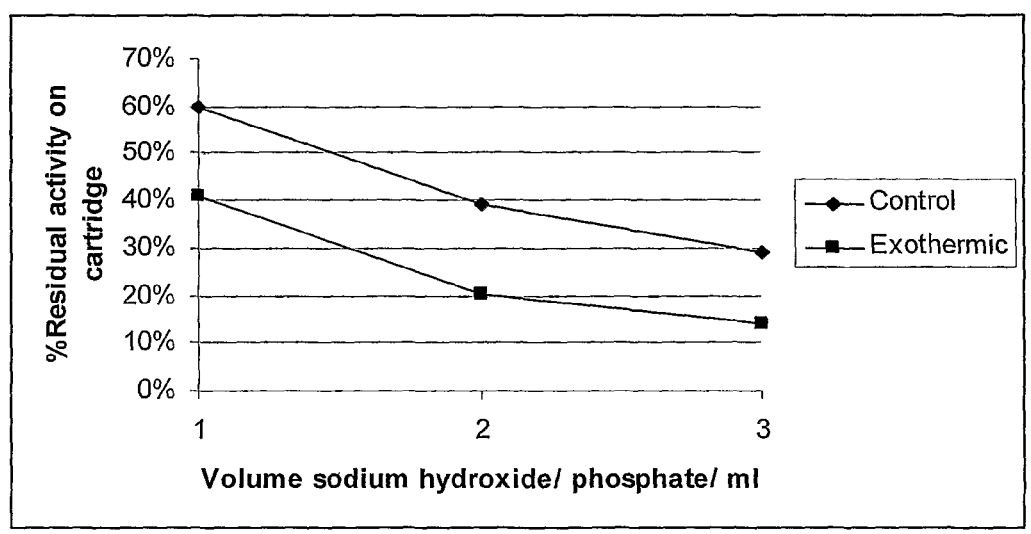
FIG. 4 shows a comparison of the % fluoride which has been removed for the exothermic reaction and the control experiment.

A comparison of the % fluoride which has been removed for each experiment is shown in FIG. 4. There is a clear differential between the two, with only 14% of the activity being present after 3 ml for the exothermic reaction compared to 29% for the control experiment.

Conclusion

The results of Examples 1 and 2 are shown in FIGS. 3 and 4 respectively. Both preheating the sodium hydroxide or heating the cartridge have a significant beneficial effect on the rate of stripping of $^{18}$F-fluoride from acidic alumina cartridges under alkali conditions. In addition the exothermicity of the reaction between phosphoric acid and sodium hydroxide results in a substantial improvement in the same process.

Example 3

Fluoride Displacement from Acidic Alumina Cartridges Using 1 M Hydrochloric Acid Materials
Acidic alumina cartridges: Waters WAT020500 #041434265A
$^{18}$F-fluoride: Hammersmith Imanet Ltd., UK
1 M hydrochloric acid: BDH Convol 180365D #90367620
Method A 300 mg acidic alumina cartridge was equilibrated with 10 ml water and then 16.4 MBq 18-fluoride was injected. The cartridge was washed with 1 ml water and then 1 ml 1 M hydrochloric acid was injected in 1 ml aliquots collecting each fraction and measuring the activity in an ion chamber. After 3 ml the remaining activity on the cartridge was measured. The cartridge was then heated up to 70° C. using a hot air blower for 1 minute (Steinel HG3000SLE hot air gun at setting 4, position 1) and a further 1 ml of 1 M hydrochloric acid injected onto the cartridge. The fraction again collected and the radioactivity again measured together with the total activity on the cartridge.

| Fraction number | ID | Activity/MBq | Activity (time corrected)/MBq | % Displaced |
|---|---|---|---|---|
| 1 | +1 ml 1M HCl | 1.8 @ 0 mins | 1.80 | 11.1 |
| 2 | +2 ml 1M HCl | 1.1 @ 6 mins | 1.14 | 7.0 |
| 3 | +3 ml 1M HCl | 0.45 @ 10 mins | 0.48 | 2.9 |
| 4 | Heated | 4.13 @ 23 mins | 4.78 | 29.2 |
| 5 | On cartridge | 6.93 @ 26 mins | 8.17 | 49.9 |

1 M hydrochloric acid does displace fluoride from acidic alumina cartridges, though only around 21% has been displaced after 3 ml. Heating the cartridge increases the rate of desorption of the fluoride from the acidic alumina cartridge very significantly, with a further 29.2% being removed after only 1 ml 1 M hydrochloric acid.

What is claimed is:

1. A method for removal of fluoride from alumina comprising washing said alumina with an aqueous acid or alkali at elevated temperature wherein the fluoride is radiofluoride, such as [$^{18}$F]fluoride.

2. A method for removal of fluoride from alumina according to claim 1 comprising washing said alumina with an aqueous solution of a metal hydroxide at elevated temperature.

3. A method according to claim 2 wherein the metal hydroxide is sodium hydroxide or potassium hydroxide.

4. A method according to claim 1 wherein the washing is performed at a temperature of between 40° C. and boiling point of the aqueous acid or alkali, preferably at around 80° C.

5. A method according to claim 1 wherein the aqueous acid or alkali is heated by addition of an aqueous alkali or acid solution respectively.

6. An automated synthesis apparatus comprising an alumina cartridge for removal of fluoride ions from an aqueous reaction mixture, characterised in that the apparatus is adapted to allow stripping of said alumina using a method according to claim 1.

7. Apparatus according to claim 6 which is suitable for synthesis of a radiofluorinated radiotracer such as [$^{18}$F]FDG from [$^{18}$F]fluoride.

8. Apparatus according to claim 6 which comprises an alumina cartridge 12 for removal of excess fluoride, and a container of aqueous acid or alkali, such as aqueous metal hydroxide 14 connected to the alumina cartridge by way of a fluid pathway 4 characterised in that the apparatus further comprises a heat source 16 positioned and controlled so as to heat either the container of aqueous acid or alkali, such as aqueous metal hydroxide 14, or the alumina cartridge 12.

9. A cassette for an automated synthesis apparatus comprising an alumina cartridge for removal of fluoride ions from an aqueous reaction mixture, characterised in that the cassette is adapted to allow stripping of the alumina using a method according to claim 1.

10. A cassette according to claim 9 which is suitable for synthesis of a radiofluorinated radiotracer such as [$^{18}$F]FDG from [$^{18}$F]fluoride.

* * * * *